March 3, 1964 C. H. BRUMLEY 3,123,066
OPTICAL CATHETER
Filed Jan. 18, 1960 2 Sheets-Sheet 1
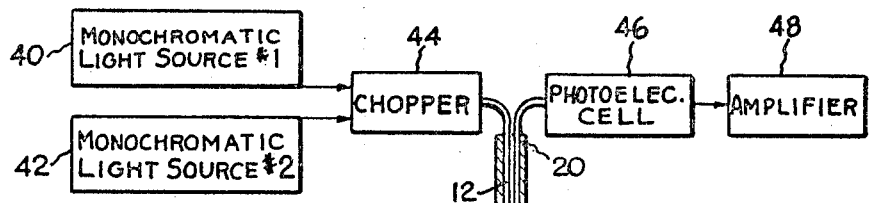
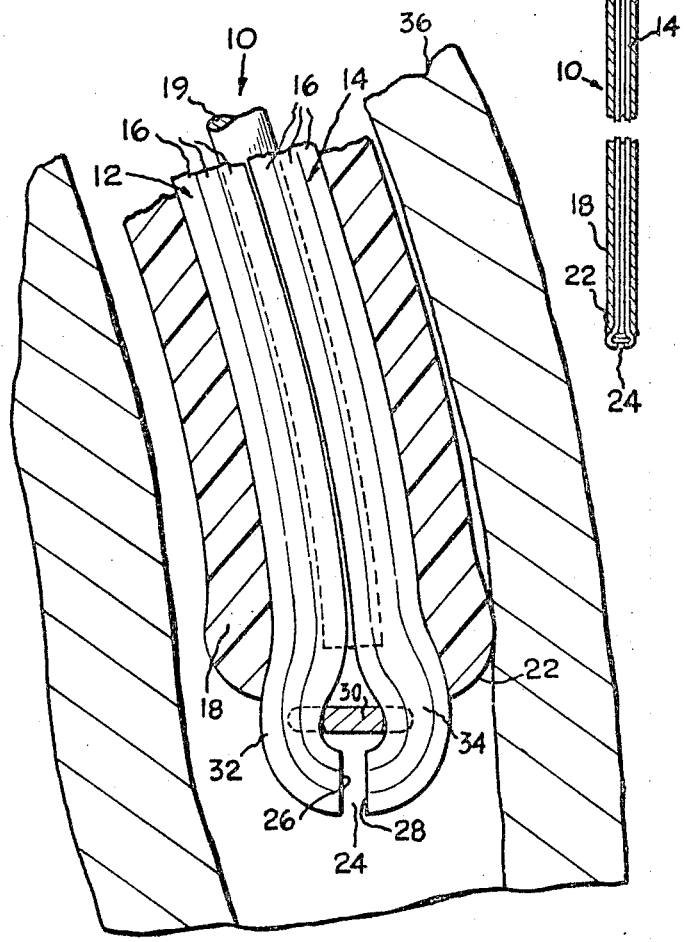
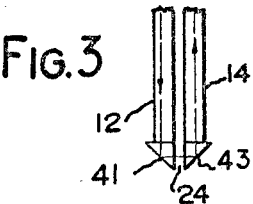
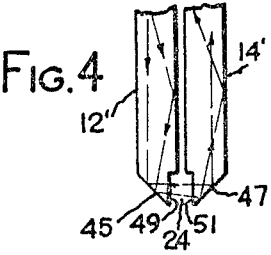
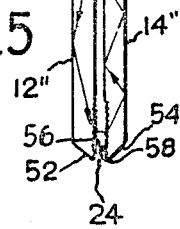
INVENTOR.
CORWIN H. BRUMLEY
BY
ATTORNEYS March 3, 1964     C. H. BRUMLEY     3,123,066
OPTICAL CATHETER
Filed Jan. 18, 1960     2 Sheets-Sheet 2
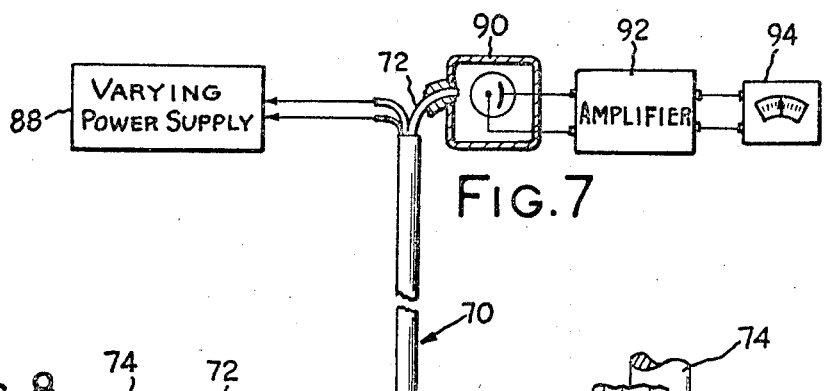
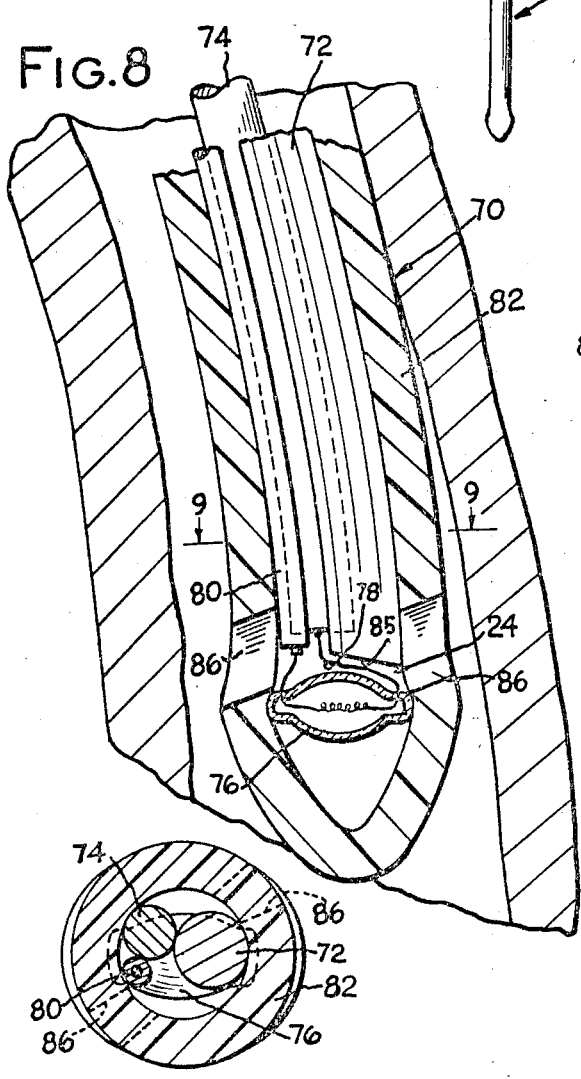
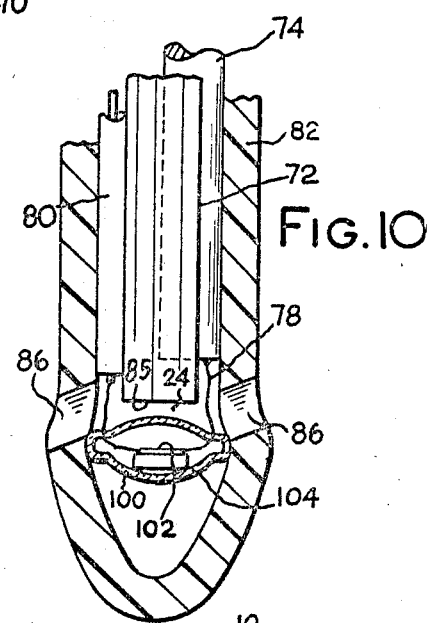
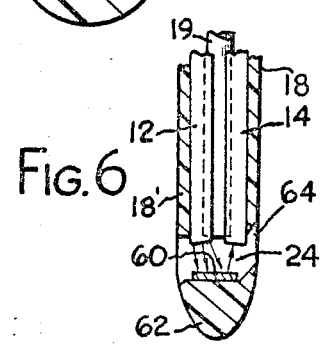
INVENTOR.
CORWIN H. BRUMLEY
BY Frank C. Parker
Hoffman Stone
ATTORNEYS United States Patent Office 3,123,066
Patented Mar. 3, 1964

3,123,066
OPTICAL CATHETER
Corwin H. Brumley, Penfield, N.Y., assignor to Bausch & Lomb Incorporated, a corporation of New York
Filed Jan. 18, 1960, Ser. No. 3,074
7 Claims. (Cl. 128—2)

This invention relates to an improved optical catheter of relatively small size and having a relatively high degree of flexibility so that it may be inserted into a blood vessel of moderate size for measuring a selected optical characteristic of blood flowing in the vessel.

Many medical diagnoses depend upon measurement of various blood conditions, certain ones of which can be determined by optical means such as, for example, colorimetry. Heretofore it has usually been necessary to remove a portion of the blood from the patient's body for measurement purposes, and it has not been possible to make measurements of the blood as it courses through a blood vessel relatively deep within the body.

Accordingly, one important object of the invention is to provide an improved optical catheter which is flexible and of relatively small size so that it may be inserted into a blood vessel for observation of the blood in its natural environment.

Another object is to provide an improved oximeter for measuring the oxygen content of blood as it flows within the body.

A further object is to provide a device of this character that is of relatively simple construction, reliable in operation, and easy to use.

The foregoing and other objects and advantages of the invention will become apparent in the following description of a representative embodiment thereof taken in conjunction with the drawing wherein:

FIG. 1 is a partly schematic view showing a catheter according to the invention together with associated colorimetric equipment, the combination being arranged for use as an oximeter;

FIG. 2 is a fragmentary sectional view on an enlarged scale, showing the catheter portion of the oximeter within a blood vessel;

FIG. 3 is a partly schematic view illustrating the tip portion of a catheter according to a second embodiment of the invention;

FIG. 4 is a partly schematic view illustrating the tip portion of a catheter according to a third embodiment of the invention;

FIG. 5 is a partly schematic view illustrating the tip portion of a catheter according to a fourth embodiment of the invention;

FIG. 6 is a partly schematic view illustrating the tip portion of a catheter according to a fifth embodiment of the invention;

FIG. 7 is a partly schematic view of a catheter according to a sixth embodiment of the invention together with associated colorimetric equipment;

FIG. 8 is an enlarged sectional view of the tip portion of the catheter shown in FIG. 7;

FIG. 9 is a cross-sectional view taken along the line 9—9 of FIG. 8; and,

FIG. 10 is an enlarged sectional view of the tip portion of a catheter according to a seventh embodiment of the invention.

As a result of relatively recent developments in the field now known as fiber optics, it is now possible to make relatively small diameter, flexible, light conducting instruments such as endoscopes for medical use for observing hitherto inaccessible cavities in the body. Instruments of this type generally comprise one or more bundles of elongated, flexible, light conducting members, each one of which is capable of conducting light from one end to the other because of the effect known as total internal reflection. The individual elements may be made of glass, and are of relatively small diameter such as about 10 to 75 microns in order to make them sufficiently flexible, and to restrict the size of the bundle of light rays in each element, thereby permitting the elements to be bent relatively sharply without danger of the rays escaping through the surface of the elements.

The present invention makes use of the advantages of fiber optics to provide a catheter for use as the sensing portion of an oximeter, the catheter being highly flexible and sufficiently small in cross section to be inserted into the blood vessel system of the human body for measuring the oxygen content of the blood in its natural environment.

Referring now to the drawing, the catheter 10 shown in FIGS. 1 and 2 thereof represents a preferred embodiment of the invention and comprises two relatively small diameter, elongated, flexible light conductors 12 and 14, each one of which is composed on one or more glass fibers 16 of about 10 to 75 microns diameter each. Each conductor may be, for example, about 1 mm. in diameter, although this dimension may be varied within relatively wide limits depending upon the size of the body cavity to be investigated. The two conductors 12 and 14 are enclosed for most of their length within a flexible tube 18, which may be of any desired material such as, for example, rubber, or synthetic plastic. A stiffening wire 19 is also enclosed in the tube 18 to provide the resilience required for ease of manipulation. In some instances, the tube 18 itself may be sufficiently resilient for this purpose, in which event, the wire 19 may be omitted. The conductors 12 and 14 project out of the tube 18 at one end 20 for connection to the other portions of the colorimeter apparatus.

The conductors also project out of the opposite end 22 of the tube and are there formed to define a light gap 24. In the embodiment shown in FIGS. 1 and 2, the conductors 12 and 14 are bent in the form of half loops so that their ends 26 and 28 stand relatively closely spaced and in confronting relationship to each other. When the conductors 12 and 14 are composed of a plurality of individual fibers, it is preferred to protect the exposed looped portions 32 and 34 against fraying. For this purpose, the looped portions 32 and 34 may be potted in a material such as, for example, certain resins, or a relatively low refractive index and low melting point glass. Additionally, a spacer 30 may be inserted between the looped portions 32 and 34 of the two conductors for maintaining the spacing between the confronting ends 26 and 28. The elasticity of the tube 18 may be relied upon to urge the looped portions 32 and 34 together thereby keeping the spacer 30 under compression and preventing its accidental escape, but preferably the spacer 30 is cemented in place.

The overall diameter of the tube 18 may be made relatively small such as, for example, about 2.5 mm. or less so that the catheter may be inserted into relatively small blood vessels.

In operation, an incision is made in a blood vessel 36, and the catheter is inserted through the incision and manipulated through the vessel until the light gap 24 arrives at the desired location in the blood vessel system. The resilience and flexibility of the catheter permits the surgeon to control the catheter and to guide it to the desired location. Blood flowing through the blood vessel passes through the gap 24 where it is measured for color.

Toward this end the ends of the two conductors 12 and 14 opposite from the light gap 24 are connected to conventional color determining apparatus for oximetric use. The apparatus shown includes two monochromatic light sources 40 and 42, respectively, which project light of different respective colors into a chopper 44. One conductor 12 of the catheter is connected to the output of the chopper 44 and receives therefrom a series of pulses of light, successive ones of which are of different respective colors. The light pulses from the chopper 44 travel along the length of the one conductor 12, and emerge at the end of the conductor opposite from the chopper. The emergent light is attenuated by the blood in the gap 24, and then enters the end 28 of the second conductor 14, and is transmitted through the conductor 14 to a photosensitive device 46, the output of which is fed to an amplifier 48 for operating any desired type of indicating device (not shown).

In effect, the catheter 10 of the present invention takes the place of the ordinary sample cell in a conventional transmission type oximeter, the first conductor 12 functioning as the input window of the sample cell, and the second conductor 14 functioning as the output window. The catheter 10 serves as a small diameter, flexible, optical extension so that the sample cell of the oximeter may be constituted by a blood vessel deep within the patient's body. The catheter 10 may be made relatively long so that many portions of the body may be reached that were heretofore accessible only through radical surgery.

Since only light transmission and absorption effects are desired to be measured by the catheter according to the present invention, and transfer of an image from one point to another is not required, each one of the conductors 12 and 14 may be constituted by a single fiber 16, and in those cases where each conductor includes a plurality of fibers 16, the conductors may be incoherent, that is, the fibers need not be oriented similarly at their opposite ends, but may be crossed so that the relative locations of the fibers in each conductor may be different at the opposite ends of the conductor.

The light gap 24 may be of any desired conformation, several different modifications being shown in FIGS. 3 to 6. In the construction shown in FIG. 3, for example, small reflecting prisms 41 and 43 are fused or cemented to the ends of the two light conductors 12 and 14, instead of curving end portions of the conductors themselves to direct light across the light gap 24. In the embodiment shown in FIG. 4, the end faces of the conductors 12 and 14 are bevelled to provide internally reflecting surfaces 45 and 47 for directing light across the gap 24 between the light conductors at the ends thereof. For optimum results, the confronting end portions 49 and 51 of the side walls of the two conductors are flattened to minimize light loss.

As shown in FIG. 5, the light gap 24 may be constituted by the space between the confronting end portions 56 and 58 of the side walls of the two conductors 12 and 14 that have been roughened to minimize the total internal reflection and to serve as exit and entry windows, respectively. In this case, the end faces 52 and 54 of the conductors are preferably opacified by coating them with a reflective material such as aluminum or silver to maximize the light transmission in the desired direction, that is, through the exit window 56, and from the entry window 58 along the conductor 14.

A mirror system may also be used, as shown in FIG. 6. According to this embodiment of the invention, the protective tube 18 is extended beyond the ends of the conductors 12 and 14, the end portions of which are left straight and parallel. A mirror 60 is fixed in the tube 18 confronting the end faces of the two conductors 12 and 14 for reflecting light from one to the other. The tube 18 is preferably provided with a closed, conically shaped, nose portion 62 to facilitate its travel through blood vessels, and a transverse passageway 64 extends through the walls of the tube 18 for conducting blood through the light gap 24, which includes the spaces between the mirror 60 and the ends of the two conductors 12 and 14.

The protective tube 18 is not shown in FIGS. 3 to 5, but it will be understood that both it and the reinforcing wire 19 may be substantially the same in the embodiments shown in FIGS. 3 to 5 as in the embodiment of FIGS. 1 and 2. A spacer member similar to the spacer 30 shown in FIG. 2 may also be included in the modifications shown in FIGS. 3 to 5, as will be readily understood by those familiar with the art.

The present invention also contemplates a catheter including only a single, elongated, light conductor, which may be either a single fiber or a group of fibers, and which is used in conjunction with a sub-miniature radiant energy transducer (either an electrically energizable light source, or a photosensitive pick-up device) disposed adjacent to the exposed end of the conductor. Two examples of this type of construction are shown in FIGS. 7 to 10.

The modification illustrated in FIGS. 7, 8, and 9, includes a catheter 70 comprising a single elongated light conductor 72, a relatively resilient, reinforcing wire 74, an electrically energizable light source 76, electrical leads 78 and 80 for the light source, and an enveloping, protective tube 82. The end of the tube 82 is preferably closed, and the light source 76 is mounted within the tube 82 at the closed end thereof. The light conductor 72 extends through the tube 82 and terminates close to the light source 76, thereby forming a light gap 24 between the light source 76 and the end face 85 of the conductor. A passageway 86 is provided through the side wall of the tube 82 for conducting blood through the light gap 24. One electrical lead 78 for the light source 76 may be connected to the resilient reinforcing wire 74. The other lead 80 is insulated and extends through the length of the tube 82.

The light source 76 may be of any desired sub-miniature type such as the tungsten filament lamp illustrated, the spectral emission characteristics of which are controllably variable in response to variations in its energization. For example, the emission of the tungsten filament lamp illustrated shifts away from the red end of the spectrum in response to an increase of energization, and shifts towards the red end of the spectrum in response to a decrease. The separate lead 80 and the reinforcing wire 74 are electrically connected to a repetitively varying power supply 88 for energizing the light source 76 successively at different selected levels, thereby to cause the color of the light emitted by the light source 76 to shift periodically. Light emitted by the light source 76 is attenuated by the blood in the light gap 24, and then enters the conductor 72 through the end face 85 thereof, and is transmitted through the conductor 72 to a photosensitive pick-up device 90. The photosensitive pick-up device 90 produces an electrical signal in response to light received from the conductor 72 and feeds the signal to an amplifier 92, which compares the relative values of the signal during the periods of different respective energization levels of the light source 76. The output signal of the amplifier 92 may be fed to any desired indicating device 94 for indicating changes in the color of the blood in the light gap 24.

In the embodiment illustrated in FIG. 10 the transducer takes the form of a photosensitive pick-up device 100, which may be in the form of a lead sulfide photoconductive film 102 mounted within a glass envelope 104, and closely spaced from the end face 85 of the light conductor 72. In this case light is transmitted from an external source such as the monochromators 40 and 42 shown in FIGURE 1, in successive pulses of different respective colors through the light conductor 72. The pick-up device 100 develops an electrical signal in response to light transmitted through the blood in the light gap 24, which signal is carried by the leads 78 and 80 and the reinforcing wire 74 to an amplifier where it may be treated as in the hereinabove described examples.

What is claimed is:

1. An optical catheter comprising a pair of elongated, flexible light conductors, each one of said conductors including a plurality of relatively fine glass fibers, a protective tube disposed around said conductors, roughened surfaces on each of said conductors defining a light gap between confronting adjacent ends of said conductors, said tube being so arranged and constructed as to operably expose said gap to a fluid in which said means are inserted whereby when said catheter is inserted into a blood vessel and light is directed into one of said conductors it is conducted therethrough and across said light gap and the attenuation of the light by blood disposed in said light gap is indicated by the relative intensity of light emergent from the other one of said conductors.

2. An optical catheter comprising a pair of elongated flexible light conductors, a protective tube disposed around said conductors, adjacent end portions of said conductors being curved so that their end faces are disposed in relatively closely spaced confronting relationship to define a light gap, said tube being so arranged and constructed as to operably expose said gap to a fluid in which said conductors are inserted whereby when said catheter is inserted into a blood vessel and light is directed into one of said conductors it is conducted therethrough and across said light gap and the attenuation of the light by blood disposed in said light gap is indicated by the relative intensity of light emergent from the other one of said conductors.

3. An optical catheter comprising a pair of elongated flexible light conductors, a protective tube disposed around said conductors, adjacent end portions of said conductors being curved so that their end faces are disposed in relatively closely spaced confronting relationship to define a light gap, said tube being so arranged and constructed as to operably expose said gap to a fluid in which said end faces are inserted, a relatively rigid spacer disposed between said curved end portions for maintaining the spacing between said confronting end faces, whereby when said catheter is inserted into a blood vessel and light is directed into one of said conductors it is conducted therethrough and across said light gap and the attenuation of the light by blood disposed in said light gap is indicated by the relative intensity of light emergent from the other one of said conductors.

4. An optical catheter comprising a pair of elongated flexible light conductors, a protective tube disposed around said conductors, a pair of reflecting prisms respectively secured at adjacent ends of said two conductors for directing light between said conductors, said prisms being relatively closely spaced and defining a light gap between them, said tube being so arranged and constructed as to operably expose said gap to a fluid in which said prisms are inserted whereby when said catheter is inserted into a blood vessel and light is directed into one of said conductors it is conducted therethrough and across said light gap and the attenuation of the light by blood disposed in said light gap is indicated by the relative intensity of light emergent from the other one of said conductors.

5. An optical catheter comprising a pair of elongated flexible light conductors, a protective tube disposed around said conductors, adjacent ends of said conductors being beveled to define internally reflecting surfaces for directing light from generally paraxial paths within said conductors through the side walls thereof towards each other, terminal side wall portions of said conductors thereby defining a light gap, said tube being so arranged and constructed as to operably expose said gap to a fluid in which said side wall portions are inserted whereby when said catheter is inserted into a blood vessel and light is directed into one of said conductors it is conducted therethrough and across said light gap and the attenuation of the light by blood disposed in said light gap is indicated by the relative intensity of light emergent from the other one of said conductors.

6. An optical catheter comprising a pair of elongated, flexible light conductors, a protective tube disposed around said conductors, adjacent ends of said conductors being beveled to define internally reflecting surfaces for directing light from paraxial paths within said conductors through the side walls thereof towards each other, terminal side wall portions of said conductors thereby defining a light gap, said terminal side wall portions being flat, said tube being so arranged and constructed as to operably expose said gap to a fluid in which said side wall portions are inserted whereby when said catheter is inserted into a blood vessel and light is directed into one of said conductors it is conducted therethrough and across said light gap and the attenuation of the light by blood disposed in said light gap is indicated by the relative intensity of light emergent from the other one of said conductors.

7. An optical catheter comprising a pair of elongated flexible light conductors, a protective tube disposed around said conductors, adjacent ends of said conductors being beveled to define internally reflecting surfaces for directing light from paraxial paths within said conductors through the side walls thereof towards each other, terminal side wall portions of said conductors thereby defining a light gap, said terminal side wall portions being roughened to minimize internal reflection and maximize transmission of light therethrough, and a reflective coating disposed on said beveled end faces of said conductors, said tube being so arranged and constructed as to operably expose said gap to a fluid in which said side wall portions are inserted whereby when said catheter is inserted into a blood vessel and light is directed into one of said conductors it is conducted therethrough and across said light gap and the attenuation of the light by blood disposed in said light gap is indicated by the relative intensity of light emergent from the other one of said conductors.

References Cited in the file of this patent

UNITED STATES PATENTS

| | | |
|---|---|---|
| 1,590,283 | Catlin | June 29, 1926 |
| 1,751,584 | Hansell | Mar. 25, 1930 |
| 2,268,321 | Flynn | Dec. 30, 1941 |
| 2,790,438 | Taplin | Apr. 30, 1957 |
| 2,825,260 | O'Brien | Mar. 4, 1958 |
| 2,877,368 | Sheldon | Mar. 10, 1959 |
| 2,932,294 | Fourestier | Apr. 12, 1960 |
| 3,068,739 | Hicks et al. | Dec. 18, 1962 |

FOREIGN PATENTS

| | | |
|---|---|---|
| 1,123,371 | France | June 11, 1956 |